Dec. 19, 1950    T. W. MEIKLEJOHN, JR., ET AL    2,534,722
WHEEL SUSPENSION
Filed Jan. 10, 1947      2 Sheets-Sheet 1
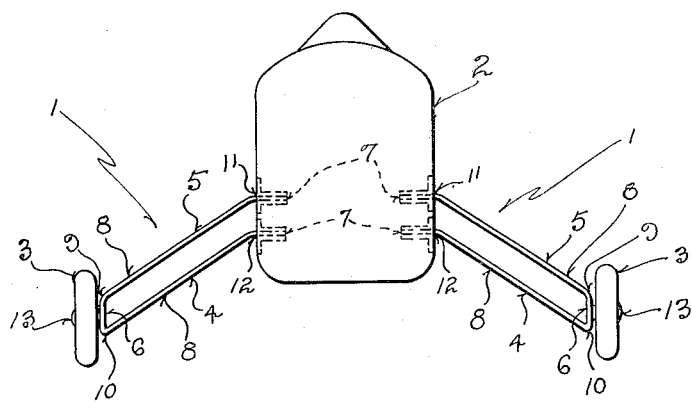
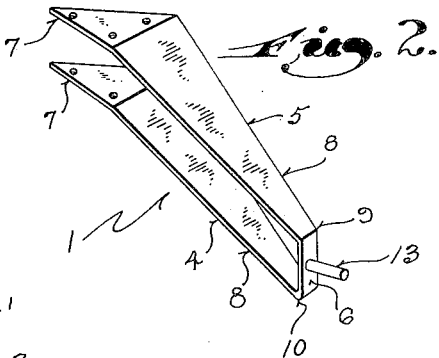
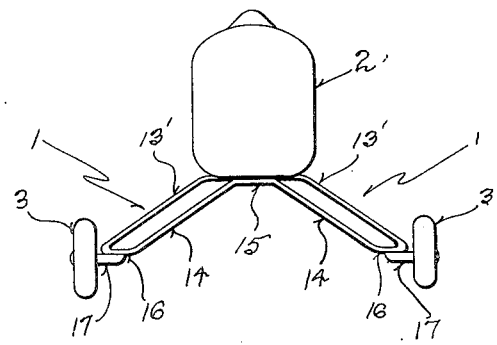
Inventor
Thomas W. Meiklejohn, Jr.
Sylvester J. Wittman Dec. 19, 1950     T. W. MEIKLEJOHN, JR., ET AL     2,534,722
WHEEL SUSPENSION
Filed Jan. 10, 1947     2 Sheets—Sheet 2
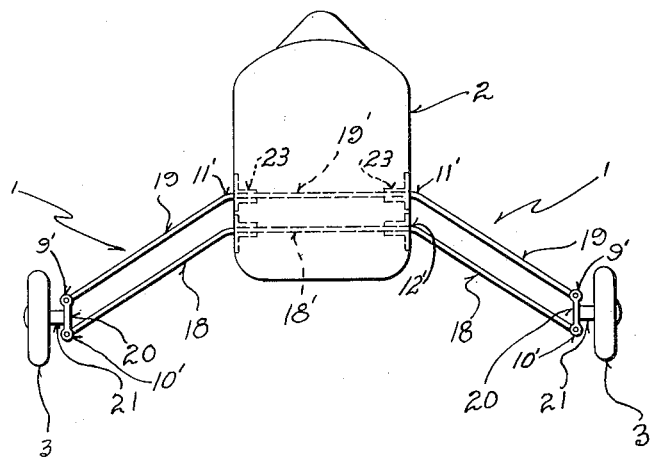
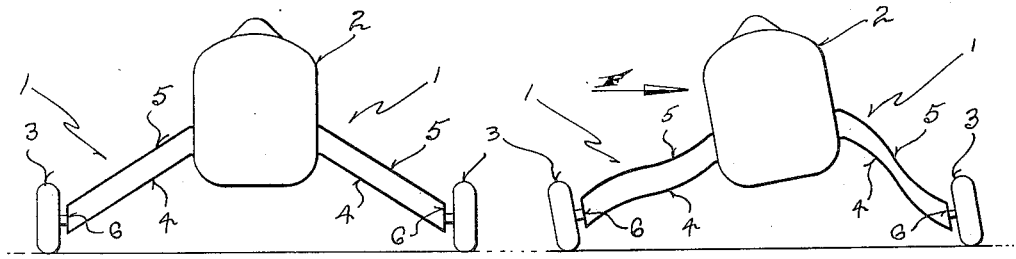
Inventors
Thomas W. Meiklejohn, Jr.
Sylvester J. Wittman Patented Dec. 19, 1950

2,534,722

UNITED STATES PATENT OFFICE 2,534,722

WHEEL SUSPENSION

Thomas W. Meiklejohn, Jr., Fond du Lac, and
Sylvester J. Wittman, Oshkosh, Wis.

Application January 10, 1947, Serial No. 721,356

5 Claims. (Cl. 244—104)

This invention relates to wheel suspensions for wheeled vehicles, and refers particularly to an improved wheel suspension system especially suited for use on high speed automobiles.

Since the center of gravity of any automobile is necessarily located some distance above the ground, the driver of a racing car must be particularly careful to prevent the vehicle from rolling over when it is making a turn at high speed. Centrifugal force due to such a turn imposes on the body of the car a lateral thrust toward the outside of the turn, but since this force is normal to the plane of rotation of the wheels, the latter tend to resist motion toward the outside of the turn. A force couple is therefore created between centrifugal force, acting at the center of gravity, and the resistance to skidding of the tires, acting at ground level. If the velocity of the automobile is high enough, or if the radius of turn is small enough, this force couple will tilt the car onto the two wheels on the outside of the turn, or even roll it over.

Although automobile race tracks and public highways are frequently constructed with banked curves designed to compensate for this rolling tendency, such grading is not always provided; and in any event it is frequently necessary to turn an automobile sharply on a straight portion of highway or racetrack in order to avoid collision with other vehicles. The driver is thus confronted with a perilous dilemma, since he must choose between the risk of collision and that of rolling over.

This effect of centrifugal force is also present in airplanes, where a sudden turn occurring while the aircraft is rolling along the ground (known as a groundloop) may tilt the aircraft to such an extent that the tip of the wing on the outside of the turn is dragged along the ground, which, of course, is highly objectionable.

However, if an automobile or airplane can be prevented from tilting toward the outside of a turn, the danger of rolling over or dragging a wingtip will be eliminated. The wheel suspension of this invention converts sideward thrust due to centrifugal force of a sudden turn by the vehicle into a movement of the chassis which lifts the side of the body toward which such sideward thrust is exerted, thus automatically banking the chassis into the turn and improving the attitude of the vehicle while the turn is in progress.

It is, therefore, an object of this invention to provide a wheel suspension for wheeled vehicles which will place the chassis of the vehicle in a banked attitude corresponding to the direction in which it is turning.

Another object of this invention resides in the provision of a wheel suspension for wheeled vehicles which inherently provides adequate shock absorption and at the same time improves the attitude of the vehicle when making a sharp turn.

Another object of this invention is to provide a wheel suspension for vehicles which will not only tilt the body or chassis of the vehicle into a banked condition during a turn but will also tilt the wheels toward the inside of the turn to afford greater assurance against tipping.

It is another object of this invention to provide an undercarriage for airplanes which will automatically raise the wing on the outside of a sudden turn while the airplane is rolling along the ground.

Still another object of this invention resides in the provision of an undercarriage for airplanes which will convert sideward thrust due to the centrifugal force of a groundloop into responsive movement lifting the wing on the outside of the turn.

With the above and other objects in view which will appear as the description proceeds, this invention resides in the novel combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed in accordance with the best modes so far devised for the practical application of the principles thereof, and in which:

Figure 1 is a diagrammatic front view of a vehicle provided with the wheel suspension of this invention;

Figure 2 is a perspective view of one of the wheel suspension or leg units shown detached from the vehicle;

Figures 3 and 4 are views similar to Figure 1, but showing somewhat modified embodiments of the invention; and Figures 5a and 5b are diagrams illustrating the action involved in the response of the leg or suspension units to side thrust.

Referring now more particularly to the accompanying drawings, in which like numerals designate like parts throughout the several views, the numeral 1 designates generally one of the legs or suspension units by which the vehicle body 2 is supported on wheels 3. This leg or suspension unit is duplicated at opposite sides of the car and consists of two superimposed spring blades 4 and 5 connected at their outer ends by an end member 6 and attached at their inner ends to the vehicle body 2. As shown in Figure 2, each leg or suspension unit may be formed from a single length of tempered steel plate or other suitable spring material.

In that form of the invention shown in Figures 1 and 2, each spring blade of the leg or suspension unit has a horizontal substantially triangular attaching portion 7 integral with the upper ends of downwardly and outwardly inclined tapered portions 8. The taper of the portions 8 assures that spring loads will be distributed evenly throughout their length.

The end members 6 which connect the free outer ends of the spring blades 4 and 5 to secure the same in spaced apart parallel relationship to one another may be integral with or hinged to the blades, but the points of connection 9 and 10 between the end members 6 and the ends of the spring blades should be parallel with the points of connection 11 and 12 between the spring blades and the body or fuselage.

A stub axle 13 is suitably secured to each end member 6 as by welding, and the wheels 3 are journalled thereon. It is to be understood, of course, that in aircraft, pontoons, skis or skids might be secured to the stub axles in lieu of wheels.

In the modified embodiment of the invention shown in Figure 3, the leg or suspension units are formed from two similar but different sized generally inverted U-shaped springs 13' and 14, the former superimposed upon the latter. These springs have upper central attaching portions 15 secured together and to the bottom of the vehicle body.

Link members 16 are secured to the lower free ends of the springs 13' and 14 either by hinge connections or in a manner similar to that of the embodiment depicted in Figures 1 and 2, except that the link members 16 are substantially horizontal rather than vertical. Stub axles 17 adapted to receive wheels 3, or, in the case of aircraft, other means adapted to receive the desired type of alighting gear, are secured to the link members 16 in a suitable manner.

In the embodiment of the invention shown in Figure 4, the spring blades 18 and 19 are separate substantially U-shaped structural members, the closed ends 18' and 19' of which extend horizontally through the chassis or fuselage 2 and are rigidly anchored therein at points 11' and 12' adjacent the sides of the fuselage, by means of brackets 23 or the like. End members 20 hold the outer ends of the blades 18 and 19 in spaced apart relationship, and are hingedly secured to the blades at points 9' and 10', so that the four points of securement 9', 10', 11' and 12' define the four corners of a parallelogram comprising the free outer portions 18 and 19 of the blades, the end member 20, and that portion of the fuselage between the attaching points 11' and 12' of the blades. The axles 21 or other alighting gear attachments may be suitably secured to the inner blades 18 but have been shown secured to the end members 20 as in the embodiment shown in Figure 1.

The wheel suspension of this invention is adaptable to numerous applications and may be embodied in a variety of structures. The general principle of its operation is shown in Figures 5a and 5b which depict diagrammatically the action of the wheel suspension when a sideward thrust is imposed upon the body of a vehicle or fuselage of an airplane on which it is employed. When no sideward force is imposed, the body or fuselage is held level laterally, by the resilience of the leg units as shown in Figure 5a. In this condition the resilience of the leg units will enable the suspension to act as an efficient shock absorber.

When a sideward thrust is imposed upon the vehicle in the direction indicated by the arrow F due, for example, to the centrifugal force present in a high speed turn of short radius the blades of the leg or suspension units will flex and the blades of the unit on the outside of the turn, i. e., the side toward which the force is directed will assume an outwardly and upwardly bowed more vertical position while those of the unit on the other side of the vehicle bow inwardly and downwardly toward a more horizontal position thereby tilting the vehicle body to bank the same into a turn. In addition the wheels are tilted or banked slightly to resist skidding and tipping. This follows from the fact that the blade members at all times form two sides of a parallelogram of which the other two sides are formed by a line connecting the points at which the blade members join the chassis or fuselage and a line connecting the points at which the blade members are joined to the end members.

From the foregoing description, taken together with the accompanying drawings, it will be readily apparent that this invention provides a wheel suspension for wheeled vehicles such as automobiles, aircraft and the like which effects banking of the vehicle chassis or fuselage into a turn to improve the attitude of the vehicle.

What we claim as our invention is:

1. A suspension for a wheel of a vehicle comprising: a pair of flexible supporting members of equal length having both of their inner ends secured to the vehicle in spaced apart relationship to one another; a member connecting the outer ends of said supporting members in spaced apart relationship such that the two members at all times define opposite sides of a parallelogram, the other two sides of which are defined by a line connecting the points of attachment of said members to the vehicle and a line connecting the outer ends of said members; and a journal adapted to receive a wheel carried by the outer ends of said members.

2. A wheel suspension for a wheeled vehicle comprising: a pair of substantially similar blades of flat spring material; means securing both of said blades to the vehicle in spaced apart relationship with one another and with said blades extending downwardly and outwardly from the vehicle, normally parallel to one another; a member hingedly connected with the outer ends of said blades to secure the blades in spaced apart parallel relationship, the hinge axes of said member being on a line parallel to a line through the points of securement of said blades to the vehicle; and an axle carried by said blades adjacent to their outer ends.

3. A carriage for wheeled vehicles comprising: a pair of flexible supporting members of substantially equal length; means securing the inner ends of each of said members to a vehicle in spaced apart relationship to one another, with said members extending outwardly and downwardly from their points of securement in superimposed normally parallel relation to one another; a tie member secured to the outer ends of said members and holding said outer ends spaced apart a distance equal to the spacing of the inner ends of the members so as to at all times hold the members substantially parallel to one another; an axle carried by said tie member; and a wheel journaled on said axle.

4. A suspension for a wheel of a vehicle comprising: a pair of flexible supporting members; means securing the inner ends of said members to a vehicle in spaced apart relationship and from which the supporting members extend downwardly and outwardly equal distances, parallel to one another; a tie member connected to the outer ends of said supporting members and holding their outer ends spaced apart a distance such as to hold said members at all times parallel to one another; and a journal adapted to receive a wheel carried by the outer ends of said members.

5. A carriage for a vehicle comprising: a pair of supporting members of substantially equal length, one of said members being longitudinally flexible; means securing each of said members to a vehicle in spaced apart relationship to one another with said members extending outwardly and downwardly from their points of securement in superimposed normally parallel relation to one another; a tie member secured to the outer ends of said members and holding said outer ends spaced apart a distance such as to at all times hold the members substantially parallel to one another, the points of securement of the tie member to the outer ends of said supporting members being on a line substantially parallel to a line through the points of securement of said members to the vehicle; and means carried at the outer ends of said supporting members for carrying running gear.

THOMAS W. MEIKLEJOHN, Jr.
SYLVESTER J. WITTMAN.

REFERENCES CITED

The following references are of record in the file of this patent:

UNITED STATES PATENTS

| Number | Name | Date |
|---|---|---|
| 2,162,067 | Dreyer | June 13, 1939 |
| 2,163,653 | Wittman | June 27, 1939 |
| 2,186,065 | Fischer | Jan. 9, 1950 |